(12) United States Patent
Zhang et al.

(10) Patent No.: US 8,483,574 B2
(45) Date of Patent: Jul. 9, 2013

(54) CORRELATION-CONTROL QPSK TRANSMITTER

(75) Inventors: Hongbin Zhang, Marlboro, NJ (US); Yu Sun, Lausdale, PA (US); Carl Davidson, Warren, NJ (US); Yi Cai, Jackson, NJ (US)

(73) Assignee: Tyco Electronics Subsea Communications, LLC, Eatontown, NJ (US)

( * ) Notice: Subject to any disclaimer, the term of this patent is extended or adjusted under 35 U.S.C. 154(b) by 291 days.

(21) Appl. No.: 12/905,717

(22) Filed: Oct. 15, 2010

(65) Prior Publication Data

US 2012/0093510 A1     Apr. 19, 2012

(51) Int. Cl.
*H04B 10/00* (2006.01)
*H04B 10/04* (2006.01)
*H04B 10/06* (2006.01)

(52) U.S. Cl.
USPC ........... 398/158; 398/184; 398/192; 398/201; 398/207

(58) Field of Classification Search
USPC ................. 398/183–185, 192, 193, 201, 205, 398/207, 158
See application file for complete search history.

(56) References Cited

U.S. PATENT DOCUMENTS

| 8,073,338 | B2 * | 12/2011 | Buelow | 398/184 |
|---|---|---|---|---|
| 8,213,806 | B2 * | 7/2012 | Griffin | 398/188 |
| 2007/0216988 | A1 | 9/2007 | Caplan | |
| 2010/0189437 | A1 | 7/2010 | Hoshida | |
| 2010/0196016 | A1 * | 8/2010 | Zhang et al. | 398/152 |
| 2010/0322631 | A1 | 12/2010 | Nagarajan et al. | |

FOREIGN PATENT DOCUMENTS

WO       20091071964 A1     6/2009

* cited by examiner

*Primary Examiner* — Dalzid Singh

(57) ABSTRACT

An optical transmitter utilizing a multi-level data modulator to produce a PDM-QPSK signal, a one-bit delay interferometer configured to correlate the multi-level data modulated signal and an optical filter configured to combine the correlated multi-level data modulated signal with one or more neighboring signals prior to transmitting over one of a plurality of optical channels. The PDM-QPSK correlated signal is configured to reduce the signal spectrum thereby increasing spectral efficiency of the transmitted signal.

20 Claims, 5 Drawing Sheets

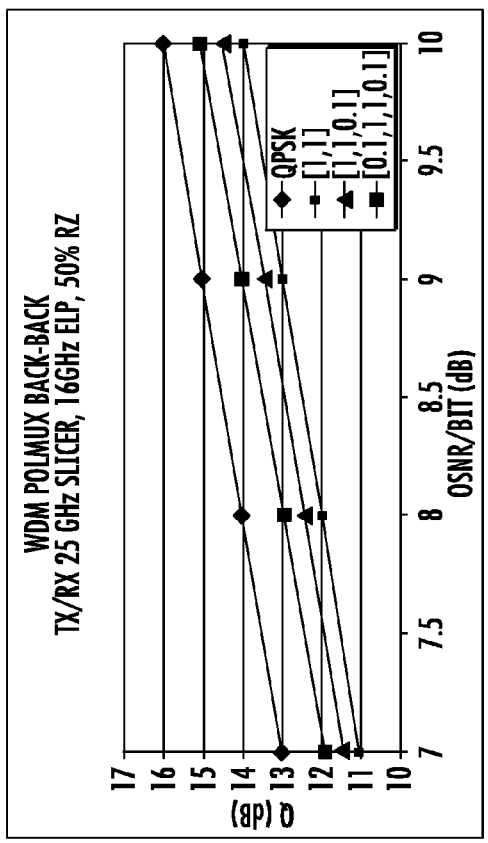
FIG. 5A
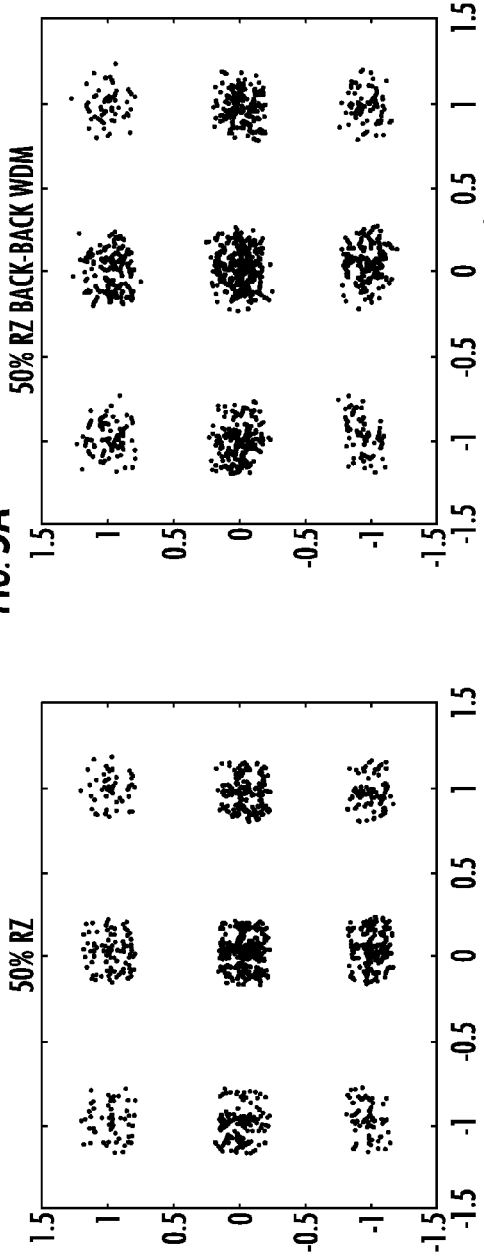
FIG. 5C
FIG. 5B

CORRELATION-CONTROL QPSK TRANSMITTER

FIELD OF THE INVENTION

Embodiments of the present disclosure relate to the field of optical communication systems. More particularly, the present disclosure relates to the correlation-control of quadrature phase-shift keying modulation.

DISCUSSION OF RELATED ART

In optical communication systems, various modulation schemes are used to transmit optical signals over fiber optic cables. These modulation techniques are used to maximize the amount of information transmitted by reducing the spectral bandwidth required to transmit each of a plurality of channels in a dense wavelength division multiplexed (DWDM) signal. For example, Phase Shift Keying (PSK) is a binary modulation method where ones and zeros are identified by changes in the phase of the optical carrier. PSK may be implemented by turning the transmitter on with a first phase to indicate a one and then with a second phase to indicate a zero. In a differential phase-shift-keying (DPSK) format, the optical intensity of the signal may be held constant, while ones and zeros are indicated by differential phase transitions.

For higher bit rates, multi-level modulation formats have been attractive due to their high spectral efficiency. An example of such a multi-level modulation format includes quadrature phase-shift keying (QPSK) where multiple data bits may be encoded on a single transmitted symbol using multiple phases. In particular, QPSK is a modulation technique for transmitting a pair of data bits with a four-level code where each pair of bits is encoded during each symbol period as one of four possible phases of a transmitted carrier signal. Because QPSK has four possible phase states, two bits per symbol may be encoded using this format. For example, the four phases in which a carrier may be sent in QPSK is 45° which corresponds to bits "00", 135° which corresponds to bits "01", 225° which corresponds to bits "11" and 315° which corresponds to bits "10". Each pair of bits may be derived sequentially from the same data stream where the bit period for the data stream is one half the symbol period of the resulting QPSK signal.

Recently, optical communication systems capable of transmitting 100 Gb/s per channel are becoming more popular with increased demand. In these systems, transmission using polarization division multiplexing (PDM) QPSK modulation at 50 Ghz channel spacing has become a widely accepted format. Polarization division multiplexing is a scheme in which information is carried in two polarization components of the transmitted light signal. The spectral efficiency for such 100 Gb/s data rate systems at 50 GHz channel spacing is 200%. Allowing more closely spaced DWDM channels for a given data line rate is synonymous with increasing the spectral efficiency. The spectral efficiency has units of (bit/s)/Hz, and is defined for a given channel as the data line rate divided by the channel spacing. Thus, by decreasing the channel spacing to 25 GHz or less for the same 100 Gb/s transmission rate, the spectral efficiency increases to 400%. In order to achieve this spectral efficiency at these channel spacings, the modulated signals must pass through narrow filtering in order to avoid crosstalk from closely spaced neighboring channels.

One higher multi-level modulation format used to accomplish these high transmission rates is PDM 16-QAM (Quadrature Amplitude Modulation). The 16 QAM format carries information about both the amplitude and phase of the signal which has two components each with a phase relation of 90 degrees (in-phase (I) and quadrature phase (Q) components). In this manner, 16 QAM modulation format can transmit four (4) bits of information per symbol. However, the 16-QAM format has 4 dB less sensitivity then QPSK, and is more sensitive to optical phase noise. Therefore, a PDM 16-QAM modulated signal with 400% spectral efficiency has a limited transmission distance of around 1000 km. Alternatively, a PDM-QPSK modulated signal pre-filtered by optical interleaving filters may be used for longer transmission distance, but has the drawback of generating long-length inter-symbol interference (ISI). Generally, ISI is a transmission impairment related to deterministic degradations or distortions in the bit pattern of a received optical signal.

At high bit rate transmission, it becomes critical to manage ISI impairments to maintain the integrity of the transmitted signals. In addition, long-length ISI is undesirable since it prohibits the implementation of a maximum-likelihood sequence detector (MLSE) utilized in real time at the receiver portion of an optical communication system. Briefly, MLSE is implemented at the receiver using the Viterbi algorithm which determines the most probable input data sequence for the received signals through dynamic linear programming. Long-length ISI may compromise the effectiveness of MLSE by making it more difficult for the receiver to determine the probable input data sequence based on the received signal. Accordingly, it is desirable to maintain a short ISI length while transmitting a QPSK signal through narrow optical filters in an optical communication system to maintain the integrity of the transmitted data signals over long-haul distances.

SUMMARY

In an exemplary method, a polarization division multiplexing (PDM) quadrature phase-shift keying (QPSK) signal is received and a one-bit delay interferometer or DPSK demodulator is used to correlate the QPSK signal. The correlated QPSK signal is transmitted through a narrow-bandwidth channel to an optical receiver via a transmission medium. The optical transmitter includes a modulator configured to generate a multi-level data modulated signal. The optical transmitter also includes at least one delay interferometer configured to correlate the multi-level data modulated signal and an optical filter configured to combine the correlated multi-level data modulated signal with one or more neighboring signals prior to transmitting the modulated signal over one of a plurality of optical channels.

BRIEF DESCRIPTION OF THE DRAWINGS

FIG. 5a is a graph illustrating test results utilizing a transmitter in accordance with the present disclosure.

FIGS. 5b and 5c are constellation maps in accordance with the present disclosure.

DETAILED DESCRIPTION

Figure 1:
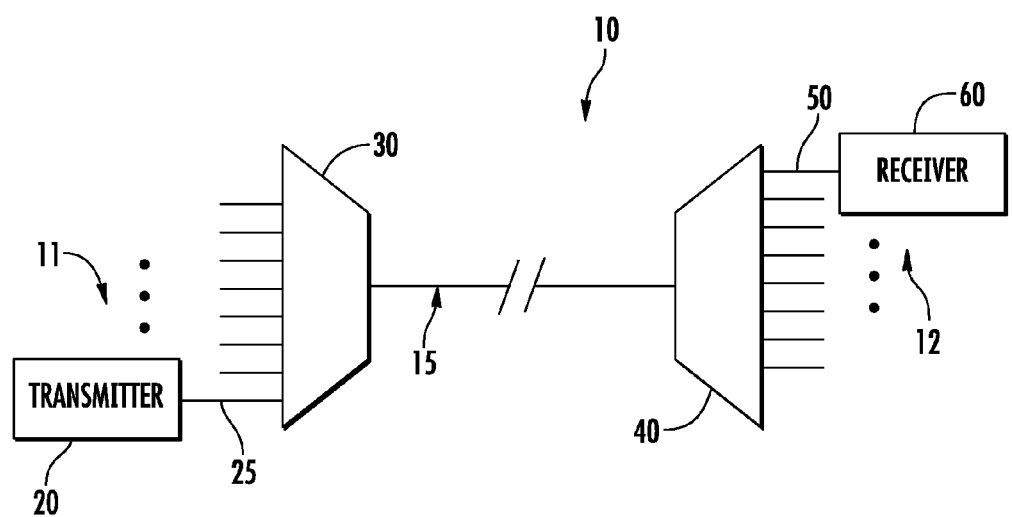
FIG. 1 is a simplified block diagram of an optical communication system in accordance with the present disclosure.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

FIG. 1 generally illustrates a simplified optical communication system 10 including an exemplary transmit terminal 11, receive terminal 12 and an optical transmission medium 15 disposed therebetween. The optical transmission medium may be a fiber optic cable having a plurality of fiber pairs configured to propagate communication signals between terminals 11 and 12. Terminal 11 includes a plurality of transmitters 20 which supplies a modulated optical signal 25 having a particular one of a plurality of wavelengths to multiplexer 30. Multiplexer 30 combines the modulated optical channels from the transmitters 20 and combines them in a dense wavelength division multiplexed (DWDM) signal for propagation over fiber optic cable 15. It should be understood that the exemplary transmitter 20 may also be included in terminal 12 for bidirectional transmission. Terminal 12 includes a demultiplexer 40 used to separate the received DWDM optical signal into individual wavelengths or channels 50. Once separated, each channel 50 is supplied to a respective receiver 60 and processed to provide a demodulated optical data signal. It should be understood that the exemplary receiver 60 may also be included in terminal end 11 for bidirectional transmission.

Figure 2:
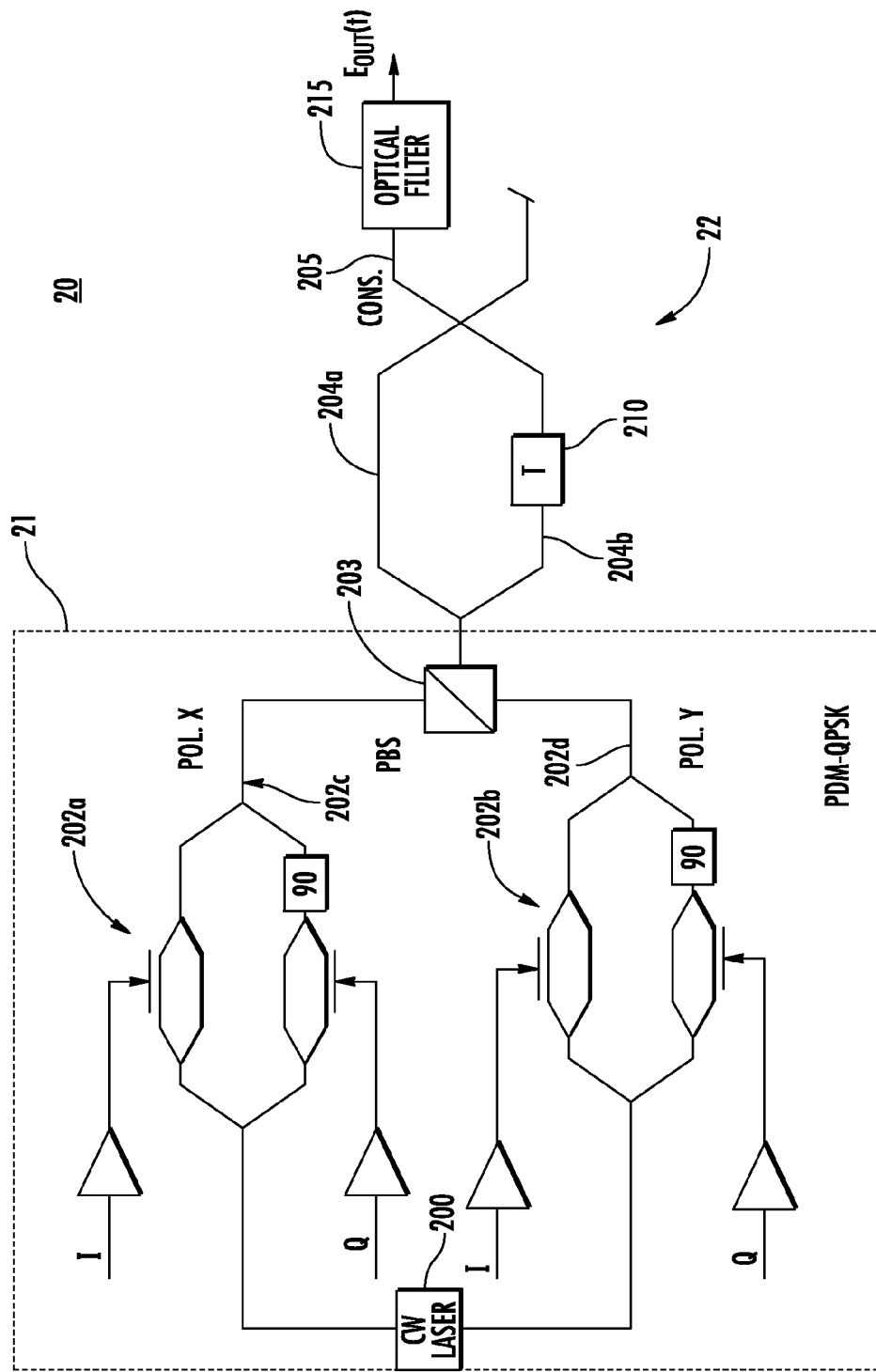
FIG. 2 illustrates a correlation controlled PDM-QPSK transmitter with two-tap correlation in accordance with the present disclosure.
Figure 3:
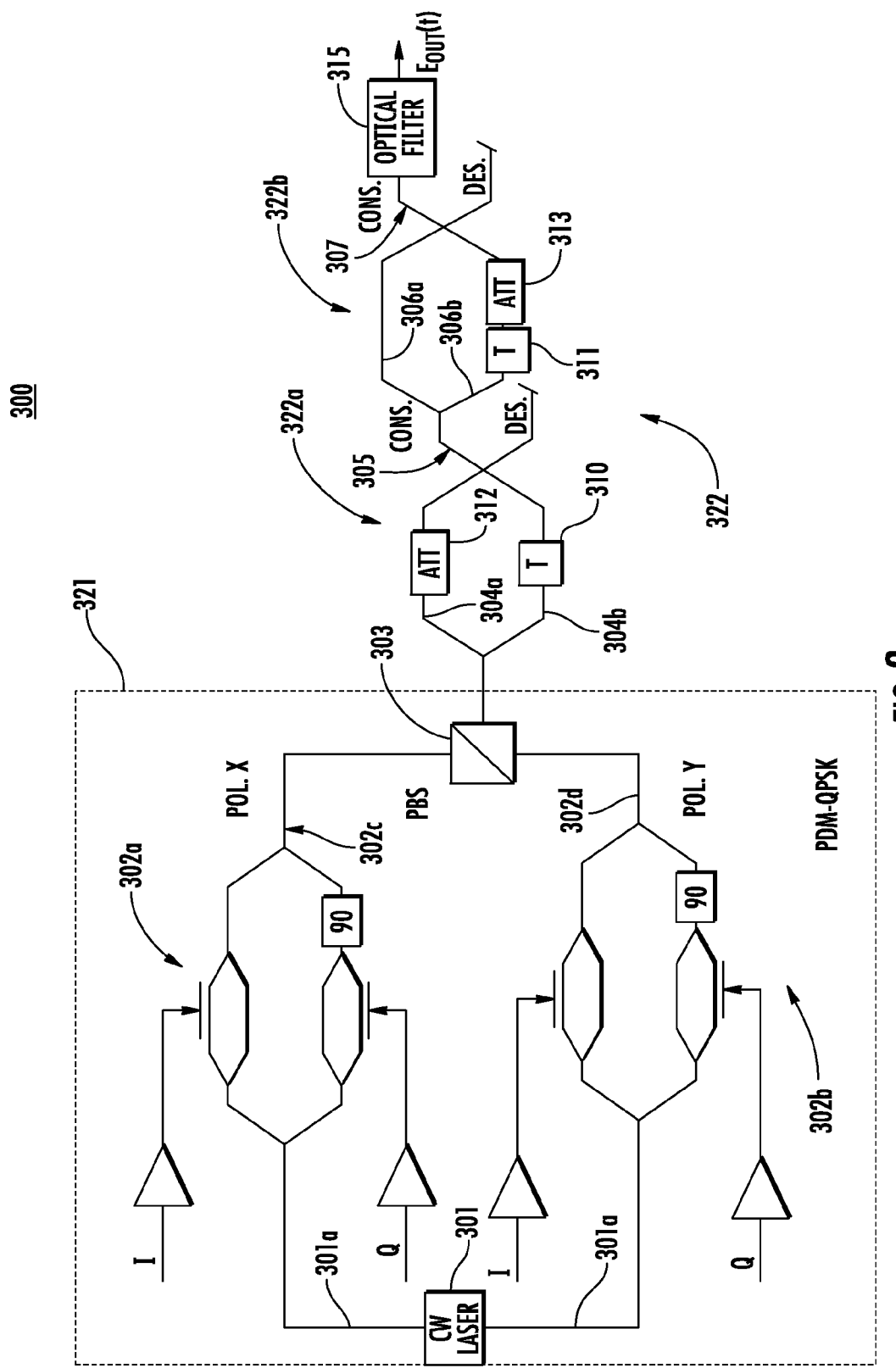
FIG. 3 illustrates a correlation controlled PDM-QPSK transmitter with three-tap correlation in accordance with the present disclosure.

As described earlier, in order to transmit and receive these optical signals long distances, various modulation techniques are employed to provide a detectable optical signal at receiver 60. These modulation techniques include, for example, QPSK, PDM-QPSK, etc. Each of the transmitters 20 comprises a light source and a PDM-QPSK modulator, at least a one-bit delay interferometer and an optical filter (as shown in FIGS. 2 and 3). Based on the number of one-bit delay interferometers, the transmitter 20 sends a correlation controlled QPSK signal with a two-tap or a three-tap correlation over each of a plurality of DWDM channels to receiver 60. As discussed in more detail below, using the transmitter 20 to correlate a modulated signal prior to propagation over cable 15 can provide a detectable optical signal at the receiver 60.

FIG. 2 is a simplified block diagram of one exemplary transmitter 20 shown in FIG. 1 used for multi-level data modulation utilizing two-tap correlation in accordance with the present disclosure. The exemplary transmitter 20 adds a correlation property into the transmitted information signal by using one or more delay line interferometers in order to obtain a desired power density of the signal thereby compressing the signal spectrum and increasing the spectral efficiency. Transmitter 20 includes PDM-QPSK portion 21 and a delay line interferometer portion 22. PDM-QPSK portion 21 includes laser 200 for producing a continuous wave (CW) optical carrier signal 201 which is split and supplied to a first IQ-modulator 202a and a second IQ-modulator 202b to generate two optical QPSK signals. In particular, the first IQ-modulator 202a modulates I data to generate a first signal component which is in phase (i.e. 0 degrees) and modulates Q data or quadrature component to generate a second signal component which is out of phase with the I component by Π/2 (90 degrees). The output of IQ-modulator 202a is supplied via port 202c to an input of polarization beam splitter 203 as a first polarization component denoted as POL X. The second IQ-modulator 202b also modulates I and Q data. In particular, second IQ modulator 202b modulates I data to generate a first signal component which is in phase (i.e. 0 degrees) and modulates Q data or quadrature component to generate a second signal component which is out of phase with the I component by Π/2 (90 degrees). The output of IQ-modulator 202b is supplied via port 202d to another input of PBS 203 as a second polarization component denoted as POL Y. The first IQ modulator 202a and second IQ modulator 202b are formed by, for example, Mach-Zehnder interferometers (MZI).

The POL X and POL Y components from the PDM-QPSK portion 21 are supplied to polarization beam splitter (PBS) 203 which is used to combine the signals and output them to the delay line interferometer portion 22. Delay line interferometer portion 22 is defined by a first path 204a, a second path 204b and a one symbol delay element 210. The combined PDM-QPSK modulated signal from PBS 203 is supplied to first path 204a and second path 204b. The second path 204b includes a one bit time delay element 210 and the constructive port 205 supplies the signal to WDM optical filter 215 which outputs the signal indicated as $E_{out}(t)$ of Equation (5) below. An example of a delay line interferometer is a DPSK demodulator and is used as a pre-filter instead of an optical interleaving filter. The free spectral range of the delay line interferometer is used as a free parameter to adjust the signal bandwidth.

In order to maintain a short inter-symbol interference length of the PDM-QPSK signal from transmitter 20, a specific correlation property is introduced into the transmitted symbols by the two-tap imbalanced MZI shown in FIG. 2. The symbols generated by transmitter 20 may have a transmitted signal spectrum in the form of Equation (1) as follows:

$$\Phi_x(f) \propto [G(f)]^2 \Phi_i(f) \qquad (1)$$

where G(f) is the Fourier transform of pulse function and $\Phi_i(f)$ is the power density function of the information sequence as defined in Equation 2.

$$\Phi_i(f) = \sum_{m=-\infty}^{\infty} \phi_i(m) e^{-2\pi fmt} \qquad (2)$$

where $\Phi_i(m)$ is the autocorrelation function of the information sequence $I_i$. By adding a correlation property into an information sequence via the two-tap correlation of transmitter 20, $\Phi_i(f)$ may be generated and the signal spectrum may be compressed. In particular, the signal generated by transmitter 20 (or dual binary modulation) has a controlled inter-symbol interference across two neighboring symbols. In this manner, the size of the signal spectrum is reduced to fit into a narrower channel spacing without generating cross-talk while still maintaining a short ISI length. For example, the two-tap correlation provided by transmitter 20 reduces the main lobe of the signal spectrum from 28 GHz to 14 GHz. Again, by reducing the size of the signal spectrum, the correlated signal may fit inside a smaller channel.

In addition, the two-tap correlation signal generated by transmitter 20 has an information sequence as shown in Equation 3.

$$I_n = b_n + b_{n+1} \qquad (3)$$

where $I_n$ is the filter output, $b_n$ and $b_{n+1}$ are sequential QPSK signals from the first and second MZI's 202a and 202b and the input data filter coefficients equal 1 (neglecting the constant loss through the DPSK demodulator). The power density spectrum of the two-tap correlation signal is depicted in Equation 4.

$$\Phi_x(f) \propto [G(f)]^2 \cos^2(\pi f T) \quad (4)$$

The constructive port of one-bit delay interferometer 210 may be represented by Equation (5)

$$E_{out}(t) = E(t) + E(t-T) \quad (5)$$

where E(t) and E(t-T) are neighboring signals. The optical filter 215, which is a normal optical slicer, may be used to combine the QPSK signal with other neighboring signals prior to transmitting over one of a plurality of channels. The optical filter 215 may also cut off the side band of the correlation controlled signal generated by transmitter 20.

FIG. 3 is a depiction of an alternative embodiment of a correlation controlled PDM-QPSK transmitter 300 with three-tap correlation in accordance with the present disclosure. The three tap correlation may be used instead of the two-tap correlation to reduce the signal spectrum to fit into a smaller channel by just increasing the ISI length from, for example, 2 to 3. The three-tap correlation transmitter may have three filter coefficients and three neighboring symbols and an information sequence as shown in Equation 6.

$$I_n = ab_n + b_{n-1} + ab_{n-2} \quad (6)$$

where $b_n, b_{n+1}$ and $b_{n-2}$ are three sequential QPSK transmit signals and b equals 1,−1, i,−i and "a" is the filter coefficient. In particular the filter coefficient "a" can be controlled by attenuator as shown in FIG. 3.

As shown in FIG. 3, transmitter 300 includes PDM-QPSK portion 321 and a delay line interferometer portion 322. PDM-QPSK modulator 321 includes a laser 301 for producing a continuous wave (CW) optical carrier signal 301a which is split and supplied to a first IQ-modulator 302a and a second IQ-modulator 302b to generate two optical PDM-QPSK modulated signals. In particular, the first IQ-modulator 302a modulates I data to generate a first signal component which is in phase (i.e. 0 degrees) and modulates Q data or a quadrature component to generate a second signal component which is out of phase with the I component by Π/2 (90 degrees). The output of IQ-modulator 302a is supplied via port 302c to a first input of PBS 303 which is a first polarization component denoted as POL X. The second IQ-modulator 302b also modulates I and Q data. In particular, second IQ modulator 302b modulates I data to generate a first signal component which is in phase (i.e. 0 degrees) and modulates Q data or quadrature component to generate a second signal component which is out of phase with the I component by Π/2 (90 degrees). The output of IQ-modulator 302b is supplied via port 302d to a second input of PBS 303 which is a second polarization component denoted as POL Y. The first IQ modulator 302a and second IQ modulator 302b are formed by, for example, Mach-Zehnder interferometers (MZI).

The POL X and POL Y signal components from the PDM-QPSK portion 321 are supplied to polarization beam splitter (PBS) 303 which is used to combine the signals and output them to delay line interferometer portion 322. In particular, delay line interferometer portion 322 includes first delay line interferometer 322a and second delay line interferometer 322b. Each of the delay line interferometers may be, for example, a DPSK demodulator. First delay line interferometer 322a is defined by a first path 304a, a second path 304b and a one symbol delay element 310. The combined PDM-QPSK modulated signal from PBS 303 is supplied to first path 304a and second path 304b. The first path 304a includes an attenuator and second path 304b includes a one bit time delay element 310. Constructive port 305 supplies the signal to second delay line interferometer 322b defined by a third path 306a, a fourth path 306b and one bit delay element 311. The signal from constructive port 305 is supplied to the third path 306a and fourth path 306b. The fourth path 306b includes a one bit time delay element 311 and an attenuator 313 coupled in series. The attenuators 312, 313 are used to control the filter coefficient "a" as of Equation (6) above. From a constructive port 307 of the fourth path 306b, the signal is supplied to optical filter 315 which outputs the signal indicated as $E_{out}(t)$ of Equation (75) below.

As discussed above with respect to the two-tap correlation controlled PDM-QPSK transmitter, the correlation controlled QPSK signal with two-stage one-bit delay interferometers from transmitter 300 may be represented by Equation (7).

$$E_{out}(t) = aE(t) + E(t-T) + aE(t-2T) \quad (7)$$

where E(t), E(t-T) and E(t-2T) are neighboring signals and a is the correlation controlled coefficient.

Figure 4:
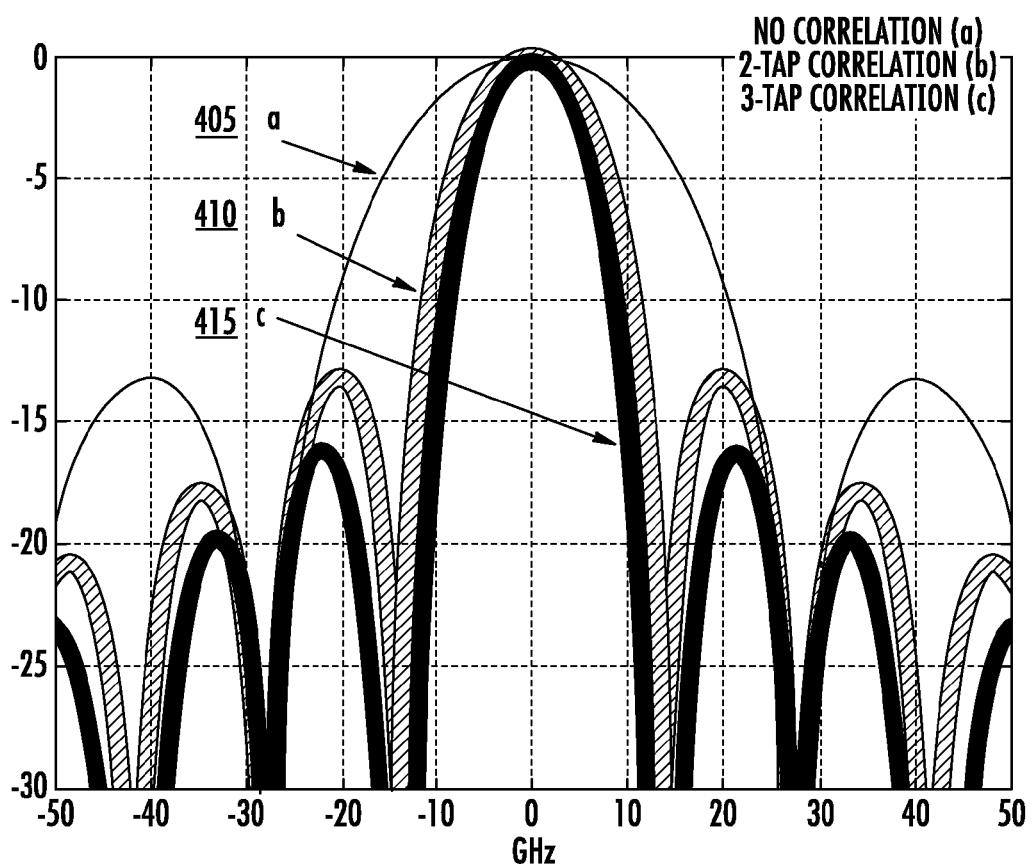
FIG. 4 is a graph showing performance of a two-tap and a three-tap correlation signal compared with a no correlation signal in accordance with the present disclosure.

FIG. 4 is a graph showing performance of a two-tap and a three-tap correlation signal compared with a no correlation signal in accordance with the present disclosure. FIG. 4 depicts a signal spectrum of QPSK, a two-tap correlation QPSK and a three-tap correlation QPSK. Line (a) 405 depicts a QPSK signal with no correlation. Line (b) 410 depicts a QPSK signal with two-tap correlation and line (c) 415 depicts a QPSK signal with three-tap correlation. As shown in FIG. 4, line (b) 410 and line (c) 415 both have a smaller signal spectrum than line (a) 405, the QPSK signal with no correlation, after the delay line interferometer (DPSK demodulator). The narrow spectrum of the two-tap correlation signal, line (b), 410 and three-tap correlation signal, line (c), 415 allow the lines (b) and (c) 410 and 415 to enter through narrow channels. For example, line (a) 405 may have a signal spectrum of 28 GHz while line (b) 410 and line (c) 415 may have 14 GHz signal spectrums. By pre-filtering the QPSK signal, a two-tap correlation controlled signal, line (b), 410 and a three-tap correlation controlled signal, line (c) 415 may be produced. Line (b) 410 and line (c) 415 may easily pass through a 25 GHz channel with little cross talk and short length of inter-symbol interference because the signals are entering a 25 GHz channel and each line only uses 14 GHz bandwidth of the mainlobe spectrum.

Referring back to FIG. 1, the signal may pass through channel 15 and may be received at the receiver 60. At the receiver 60, the two-tap or three-tap correlation signals may be interpreted. The two-tap and/or three-tap correlation signals may cause less ripples and have a shorter ISI length than signals produced by a slicer, thus it easier for the receiver 60 to interpret the one or more received signals. The receiver 60 may need to compensate for the correlation signal and uses a multi-symbol detection, such as, but not limited to, an MLSE detector to decode the correlation between the received symbols.

MLSE detection may be implemented by, for example, Viterbi algorithm. Each symbol received by receiver 60 has four levels and each filter output has four to the power of the number of symbols that may be interpreted to determine the signal. For example, the Viterbi algorithm may use 16, or $4^2$, metrics to interpret the two-tap correlation signal. In another example, the Viterbi algorithm may use 64, or $4^3$ metrics to interpret the three-tap correlation signal. The QPSK correlation signal may be limited to the two-tap and/or the three-tap correlation in order for the Viterbi algorithm to quickly interpret the signal.

FIG. 5a illustrates a graph of Q vs. optical signal to noise ratio (OSNR) per bit for each of a theoretical QPSK transmitter performance and each of the two-tap correlation controlled signals with 50% return to zero (RZ) scheme utilizing a 25 GHz slicer or filter. As can be seen, there is only 1 dB of off-set from the theoretical QPSK performance at very high spectral efficiency. The effective correlation coefficients used by MLSE algorithm are increased from 2 to 4 in order to achieve the best performance. This is because there still exists a small effect by filtering out the sidebands of the signal, so that the effective ISI length is increased from 2 symbols to 4 symbols. In addition, FIGS. 5b and 5c illustrate constellation maps for a single channel (FIG. 5b) at 50% RZ and for a WDM channel (FIG. 5c) with 50% RZ and back to back performance. As can be seen, the constellation for single channel and WDM channels are very similar and only 0.2 dB Q degradation is observed. This illustrates that WDM crosstalk is suppressed due to the narrower signal spectrum.

Embodiments of the present disclosure may be implemented at a transmitter and receiver of an optical communication system. A processor may be used to effectuate operations associated with a communication system, as is known to one of ordinary skill in the art. A processor as used herein is a device for executing stored machine-readable instructions for performing tasks and may comprise any one or combination of hardware, software, and firmware. A processor may also comprise memory storing machine-readable instructions executable for performing tasks. A processor acts upon information by manipulating, analyzing, modifying, converting, or transmitting information for use by an executable procedure or an information device, and/or by routing the information to an output device. A processor may use or comprise the capabilities of, e.g., a controller or microprocessor. A processor may be electrically coupled with any other processor, enabling interaction and/or communication therebetween. A processor comprising executable instructions may be electrically coupled by being within stored executable instructions enabling interaction and/or communication with executable instructions comprising another processor. A user interface processor or generator is a known element comprising electronic circuitry or software, or a combination of both, for generating display images or portions thereof.

An executable application comprises code or machine readable instructions for conditioning the processor to implement predetermined functions, such as those of an operating system, a context data acquisition system, or other information processing system, e.g., in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

What is claimed is:

1. A method for correlation-control of a quadrature phase-shift keying signal, comprising:
receiving a polarization division multiplexed quadrature phase-shift keying (PDM-QPSK) signal;
correlating the PDM-QPSK signal using a delay line interferometer to provide a reduced signal spectrum as compared to a non-correlated modulated signal; and
transmitting the correlated PDM-QPSK signal over an optical medium.

2. The method of claim 1 wherein the delay line interferometer is a first delay line interferometer to create a two-tap correlation PDM-QPSK signal.

3. The method of claim 1 wherein the a delay line interferometer is a first delay line interferometer, the method further comprising further correlating the transmitted correlated PDM-QPSK signal utilizing a second delay line interferometer to correlate the PDM-QPSK.

4. The method of claim 1 wherein the delay line interferometer comprises a Mach-Zehnder interferometer to correlate the PDM-QPSK signal.

5. The method of claim 1, further comprising:
using an optical filter to combine the correlated PDM-QPSK signal with at least one neighboring signal prior to transmitting the correlated PDM-QPSK signal over a channel.

6. The method of claim 5, further comprising using an optical filter to maintain a short inter-symbol interference length by adding a correlation property into the transmitted correlated PDM-QPSK signal after sending the correlated PDM-QPSK signal over the channel.

7. The method of claim 1, further comprising:
receiving the correlated QPSK signal, wherein the correlated QPSK signal has a short inter-symbol interference length; and
using multi-symbol detection to interpret the correlated QPSK signal.

8. An optical communication system configured to transmit a modulated optical signal having a plurality of optical channels, each of said channels at a particular wavelength, said system comprising:
an optical transmitter configured to modulate data on an optical signal using a multi-level data modulation format, said optical transmitter comprising:
a delay line interferometer configured to correlate the multi-level data modulated signal; and
an optical filter configured to combine the correlated multi-level data modulated signal with one or more neighboring optical signals prior to transmitting over one of said plurality of channels;
an optical transmission path coupled to said transmitter; and
a receiver coupled to the optical transmission path to receive said multi-level data modulated optical signal.

9. The optical communication system of claim 8 wherein said transmitter further comprises a PDM-QPSK modulator coupled to said delay line interferometer and configured to generate said multi-level data modulated signal.

10. The optical communication system of claim 8 wherein said optical filter combines the correlated PDM-QPSK modulated signal with the one or more neighboring optical signals prior to transmitting over the one of said plurality of channels.

11. The optical communication system of claim 8 wherein the delay line interferometer is a DPSK demodulator.

12. An optical transmitter comprising:
   a modulator configured to generate a multi-level data modulated signal;
   a delay line interferometer configured to correlate the multi-level data modulated signal; and
   an optical filter configured to combine the correlated multi-level data modulated signal with one or more neighboring signals prior to transmitting over one of a plurality of optical channels.

13. The optical transmitter of claim 12 wherein said modulator is a PDM-QPSK modulator.

14. The optical transmitter of claim 13 wherein said modulator is a first PDM-QPSK modulator, said transmitter further comprising a second PDM-QPSK modulator.

15. The optical transmitter of claim 14 further comprising a polarization beam splitter for combining a first output signal from said first PDM-QPSK modulator and a second output signal from said second PDM-QPSK modulator, said combined signal supplied to said delay line interferometer.

16. The optical transmitter of claim 12 wherein said multi-level data modulated signal is a PDM-QPSK modulated signal.

17. The optical transmitter of claim 16 wherein said a delay line interferometer is configured to correlate the QPSK signal is a first delay line interferometer, said transmitter further comprising a second delay line interferometer coupled to a constructive port of the first delay line interferometer to produce a three-tap correlated signal.

18. The optical transmitter of claim 17 wherein said first and second delay line interferometers are a first DPSK demodulator and a second DPSK demodulator respectively.

19. The optical transmitter of claim 12 wherein the optical filter is further configured to generate a short inter-symbol interference length.

20. The optical transmitter of claim 12 wherein said delay line interferometer is a DPSK demodulator.

* * * * *